United States Patent
Sauerland et al.

(10) Patent No.: US 7,116,428 B2
(45) Date of Patent: Oct. 3, 2006

(54) METHOD AND DEVICE FOR MEASURING WALL THICKNESS OF A PIPE IN A PIPE-ROLLING MILL

(75) Inventors: Martin Sauerland, Mönchengladbach (DE); Gerd-Joachim Deppe, Krefeld (DE)

(73) Assignee: SMS Meer GmbH, Monchengladbach (DE)

( * ) Notice: Subject to any disclaimer, the term of this patent is extended or adjusted under 35 U.S.C. 154(b) by 293 days.

(21) Appl. No.: 10/764,144

(22) Filed: Jan. 23, 2004

(65) Prior Publication Data
US 2005/0162662 A1    Jul. 28, 2005

(51) Int. Cl.
  *G01B 9/02* (2006.01)
(52) U.S. Cl. .................... 356/502; 356/503; 73/655; 73/597
(58) Field of Classification Search ........... 356/502, 356/503; 73/503, 655
  See application file for complete search history.

(56) References Cited

U.S. PATENT DOCUMENTS

| | | | | |
|---|---|---|---|---|
| 4,659,224 A | * | 4/1987 | Monchalin | 356/502 |
| 4,966,459 A | * | 10/1990 | Monchalin | 356/502 |
| 5,137,361 A | * | 8/1992 | Heon et al. | 356/502 |
| 5,286,313 A | * | 2/1994 | Schultz et al. | 148/508 |
| 6,078,397 A | * | 6/2000 | Monchalin et al. | 356/503 |

FOREIGN PATENT DOCUMENTS

| | | |
|---|---|---|
| EP | 0 940 193 A2 | 9/1999 |
| WO | 00/63641 | 10/2000 |

* cited by examiner

*Primary Examiner*—Layla G. Lauchman
*Assistant Examiner*—Denise B Anderson
(74) *Attorney, Agent, or Firm*—Andrew Wilford (57) ABSTRACT

A method and device for measuring the wall thickness of a pipe in a pipe-rolling mill wherein a Fabry-Pérot interferometer has its mirror spacing set by providing an input to a linear activity for one of the mirrors from a controller receiving an input from a photodiode at the output side of the interferometer. A second control circuit regulates the amplification of that photodiode with at least one parameter derived from the rolling system, for example, the input optical signal to the interferometer or a disturbance value representing for example the temperature of the rolled product and obtained through an optical pyrometer. The incoming optical signal may be tapped to another photodiode also with a variable amplification amplifier and both amplifiers may be controlled by a second controller.

24 Claims, 6 Drawing Sheets

METHOD AND DEVICE FOR MEASURING WALL THICKNESS OF A PIPE IN A PIPE-ROLLING MILL

FIELD OF THE INVENTION

Our present invention relates to a method of measuring a wall thickness of a pipe in a pipe-rolling mill, especially in the case of a pipe which is too hot to use contact-measuring techniques. The invention also relates to a device for measuring the wall thickness of a pipe and for carrying out the measured method of the invention.

BACKGROUND OF THE INVENTION

In the rolling of a pipe in a pipe-rolling mill, the measurement of wall thickness is important to determine the uniformity of the product and the achievement of the particular rolling requirements.

For this reason a laser ultrasonic method has been developed for measuring the wall thickness, both for the purposes of controlling the rolling mill and for the purpose of determining the quality of the rolled product.

In this laser ultrasonic process, an excitation laser trains a beam of laser radiation against the surface of the pipe to launch an ultrasonic pulse through the thickness of the pipe. The ultrasonic signal is reflected on the opposite wall of the pipe and the reflected ultrasonic signal returns to the surface at which the exciting laser was effected. Using an illumination laser to detect the ultrasonic signal and an interferometer for analyzing the ultrasonic-modulated laser carrier beam, an output can be provided to an evaluating unit or computer which can determine the transit time for the ultrasonic wave to cross the thickness of the pipe and calculate from that transit time and the speed of sound in the material of the pipe, the wall thickness.

In earlier systems the interferometer consisted of two mirrors which could be positioned by means of a linear actuator or effector relative to one anther at a predetermined distance. For control of this distance and the spacing of the mirrors, a photodiode measured the light transmitted by the mirror and from the measured signal a signal was applied directly or indirectly to a controller which, in turn, operated the linear actuator.

In many fields, seamless pipe of steel is required and to manufacture such pipe a cylindrical billet is pierced in an inclined roll mill by an axial piercing mandrel. The pierced billet is then rolled in pipe-rolling mill stands in a rolling line to a seamless pipe in part over the piercing mandrel at least in an early stage and subsequently without the piercing mandrel in later stages. Such a method is described, for example, in EP 0 940 193 A2.

Using stretch-reduction rolling and reducing rolling and rolling to size, seamless steel pipe can be produced with desired wall thicknesses in a plurality of such mill stands. In each of the mill stands, rolls are journaled so that each engages the periphery of the pipe over a certain limited peripheral segment and thus, for example, a roll stand can include a multiplicity of rolls, for example, three, positioned so that the pipe is contacted over the entire periphery by the rolls. The pipe is then rolled to a reduced diameter in each mill and given a true pipe shape.

The pipe following the rolling operation should have an ideal shape, that is the cylindrical outer contour and the cylindrical inner contour should form two concentric circles in each cross section through the pipe taken axially along the length of the pipe. In practice however, there are tolerances in the finished pipe so that a certain eccentricity of the circular contour of the inner periphery relative to the circular contour of the outer periphery always occurs.

A defining quality parameter for the production of the pipe by rolling is the pipe wall thickness which is measured in the course of the production process as has been described, for example, and is monitored. Around the periphery the variation in such thickness should not exceed a certain limit and along the length of the pipe, the same limit in the deviation of the wall thickness should apply.

The laser ultrasonic thickness measurement system mentioned previously is described for example in U.S. Pat. No. 5,137,361 and WO 00/63,641. The interferometer there described is a confocal Fabry-Pérot interferometer and the evaluation unit, e.g. the computer, calculates the transit time through the thickness of the wall of the pipe from the time spacing between the applied and reflected ultrasonic signal or between two echoes of the echo sequence which is produced, using the known speed of sound in the material from which the pipe is composed.

The Fabry-Pérot interferometer has two mirrors which are positioned relative to one another at a predetermined spacing and can be adjusted in this spacing by a piezo linear actuator, i.e. a crystal which displaces one of the mirrors linearly in response to an electrical signal applied to that crystal. Since it is important that the spacing of the two mirrors be exact (in the nm range), so that an effective measurement can be made of the wall thickness, the control of the spacing must use the steep flank of the intensity curve in the intensity versus frequency plot of the light signal. For this purpose, in the system of U.S. Pat. No. 5,137,361, a control circuit is provided for applying a control signal to the piezo actuator, using two photo diodes, one of which measures the light supplied to the interferometer and the other of which measures the light transmitted thereby.

It has been found in practice that this approach does not always provide a satisfactory wall thickness measurement of a pipe under the rough conditions which prevail in a pipe-rolling mill. Generally the earlier systems have not only failed to stabilize the Fabry-Pérot interferometer sufficiently, but they have also not been able to satisfactorily guarantee a reproducible result in rolling mill applications.

OBJECTS OF THE INVENTION

It is, therefore, the principal object of the invention to provide a measurement of the pipe wall thickness, especially in a pipe-rolling mill context, using the laser ultrasound method whereby a stable and reliable and effective measurement can be obtained even under the rough environmental conditions prevalent in the rolling mill and where fluctuations in the reflection from the surface measured object can occur.

Another object is to provide a measured device for carrying out the aforementioned method and, therefore, enabling highly stable, reliable and reproducible wall thickness measurements to be taken of pipe in a pipe-rolling mill whereby reflection from the surface of the pipe may vary and under the rough conditions prevalent in the rolling mill.

SUMMARY OF THE INVENTION

These objects are achieved, in accordance with the invention in a method wherein a measured signal from the photodiode receiving the transmitted light from the Fabry-Pérot pair of mirrors and/or a light signal derived from the reflected ultrasonic signal from the measurement itself are processed and applied to the controller for the linear actuator or effector and whereby the photodiodes are connected with amplifiers and the change in the measured signal gives rise to a variation in the amplification of the amplifier.

The method of the invention, therefore, is a method of measuring a wall thickness in a pipe-rolling line which comprises the steps of:

(a) launching an ultrasonic pulse into a wall of a pipe whereby an ultrasonic wave is transmitted across a thickness of the wall and an ultrasonic echo is returned to a surface of the pipe;

(b) training a laser beam from an illuminating laser onto the surface whereby a laser-light reflection from the surface is modulated by the echo;

(c) collecting laser light reflected from the surface and modulated by the echo as an input optical signal and feeding the input optical signal to a Fabry-Pérot interferometer having two mirrors spaced apart by a predeterminable distance (a), the Fabry-Pérot interferometer having an output optical signal;

(d) passing the output optical signal to a photodiode and converting the output optical signal into an electrical signal and evaluating the electrical signal to determine transit time for echoes spanning the thickness of the pipe and, from the transit time and a speed of sound in material of the pipe, the wall thickness;

(e) at least one of the steps of:

($e_1$) deriving a photodiode-measurement control signal from the electrical signal, ($e_2$) deriving a input-measurement control signal from the input optical signal, and ($e_3$) deriving a rolling-line control signal representing a fabrication process variable;

(f) controlling a linear actuator determining a position of at least one of the mirrors directly or indirectly through a controller for the linear actuator with at least one of the control signals; and (g) regulating the photodiode with the output from a variable amplification amplifier.

More particularly, in steps (e), (f) and (g), a signal measured by the photodiode, as a first photodiode, is varied as a function of the input optical signal as measured by a second photodiode and fed to the controller, each of the first and second photodiodes having respective amplifiers for amplifying the signals measured thereby, the amplifiers being further controlled in a respective control circuit based upon at least one predeterminable command variable ($F_T$, $F_R$).

When reference is made to variations of the signal which is produced by the photodiode and supplied to the controller, it is to be understood that the signal is modified in accordance with a predetermined algorithm which counteracts the disturbing influences which can destabilize the interferometer.

In a preferred embodiment of the invention the measured signal from the photodiode receiving the optical signal passed by the pair of mirrors is varied in dependence upon the light entering the interferometer and as measured by a second photodiode, the modified signal being supplied to the controller. Each of the photodiodes can be then provided with a respective amplifier which can amplify the measured signal of the respective photodiode and which, in turn, is a variable amplification amplifier such that the amplification of the respective amplifiers are controlled in dependence upon the signal from at least one of the photodiodes in a further control circuit based upon a predetermined command variable or parameter. In this manner it can be ensured that the optimum operating point of the interferometer can be maintained to ensure an exact adjustment of the correct spacing of the mirror for this operating point even in the case of fluctuations in the reflection characteristics of the surface of the object. The amplifications of the amplifiers are thus preferably a function of the signal of the second photodiode in the second control circuit based upon the latter command variable.

In a further refinement of the invention, the measured signal from the photodiode is forwarded to the controller with an input from a disturbance variable, for example a signal derived from the process, such as the measured temperature of the pipe.

Advantageously the amplifications of both of the amplifiers are controlled at least in part in dependence upon this disturbance variable which can be applied to an adder at the input of the respective amplifier. The measured temperature can be derived from a pyrometer.

Good control results are obtained when, in accordance with a further feature of the invention, the controller for the linear actuator is configured as a high dynamic controller. Especially a PID (proportional-integral-differential) controller is employed. The controller for the amplifier or amplifiers can also be a high dynamic controller, for example, a PID controller. It is however also possible to allow the last-mentioned controller to respond more slowly and then it is of advantage to use a PI (proportional-integral) controller.

To obtain the command parameter for the control process, the invention provides that at least one of the command parameters be obtained by stepwise scanning of the control circuit before operation of the system to measure pipe wall thickness in a rolling mill application.

The interferometer is preferably a Fabry-Pérot interferometer and the linear actuator is preferably a piezo element for linearly displacing one of the mirrors since such a piezo actuator or effector can position a mirror with high precision. The amplifiers can advantageously have logarithmic characteristics for efficient control of the process. One of the controllers or both of them can be digital controllers in which the control algorithm is based upon differential equations. It has been found to be especially advantageous when in addition to the previously described features of the control circuitry, the interferometer is protected by high-level damping against body waves and/or air-transmitted wave vibrations.

The device according to the invention can comprise:

a laser ultrasonic measuring unit having an excitation laser trained on a surface of a pipe for launching an ultrasonic pulse into a wall of the pipe whereby an ultrasonic wave is transmitted across a thickness of the wall and an ultrasonic echo is returned to the surface of the pipe, an illuminating laser directing a laser beam onto the surface whereby a laser-light reflection from the surface is modulated by the echo, and an interferometer receiving laser light reflected from the surface and modulated by the echo as an input optical signal and having two mirrors spaced apart by a predeterminable distance (a), the interferometer having an output optical signal evaluatable to determine transit time for echoes spanning the thickness of the pipe and, from the transit time and a speed of sound in material of the pipe, the wall thickness, the interferometer having a linear actuator for relatively displacing the mirrors to adjust the distance; and a control system acting upon the linear actuator and including:

a first photodiode receiving the output optical signal, a controller responsive to a signal obtained from the first photodiode and controlling the linear actuator, and a second photodiode receiving the input optical signal, respective amplifiers connected to the photodiodes for amplifying respective signals measured thereby, and a control circuit including a further controller for regulating amplifications of the amplifiers to predetermined values.

The mirrors of the interferometer can be mounted on a support which itself may be a sound or vibration-damping element and the underside of this support can be provided with vibration-damping feet which can rest upon the bottom of a housing or cabinet.

The latter can have plate-like damping elements composed of fibers of intermediate density, e.g. wood, and between these plates and the housing wall, a foamed synthetic resin can be injected. The result is a device for measuring the wall thickness with a high degree of precision, isolation from the rough conditions in the rolling mill and a high degree of reproducibility. The system is especially effective where the surface of the pipe to be measured may have varying reflective characteristics.

BRIEF DESCRIPTION OF THE DRAWING

The above and other objects, features, and advantages will become more readily apparent from the following description, reference being made to the accompanying drawing in which.

SPECIFIC DESCRIPTION

The principle of echo determination of transit time across the wall thickness of a pipe, utilizing ultrasonic pulses launched from the external surface into the pipe wall, has been shown diagrammatically in FIG. 5 and utilizes the modulation of a laser beam serving to detect pulses and a Fabry-Pérot interferometer as will be described in connection with FIGS. 1–3.

Figure 5:
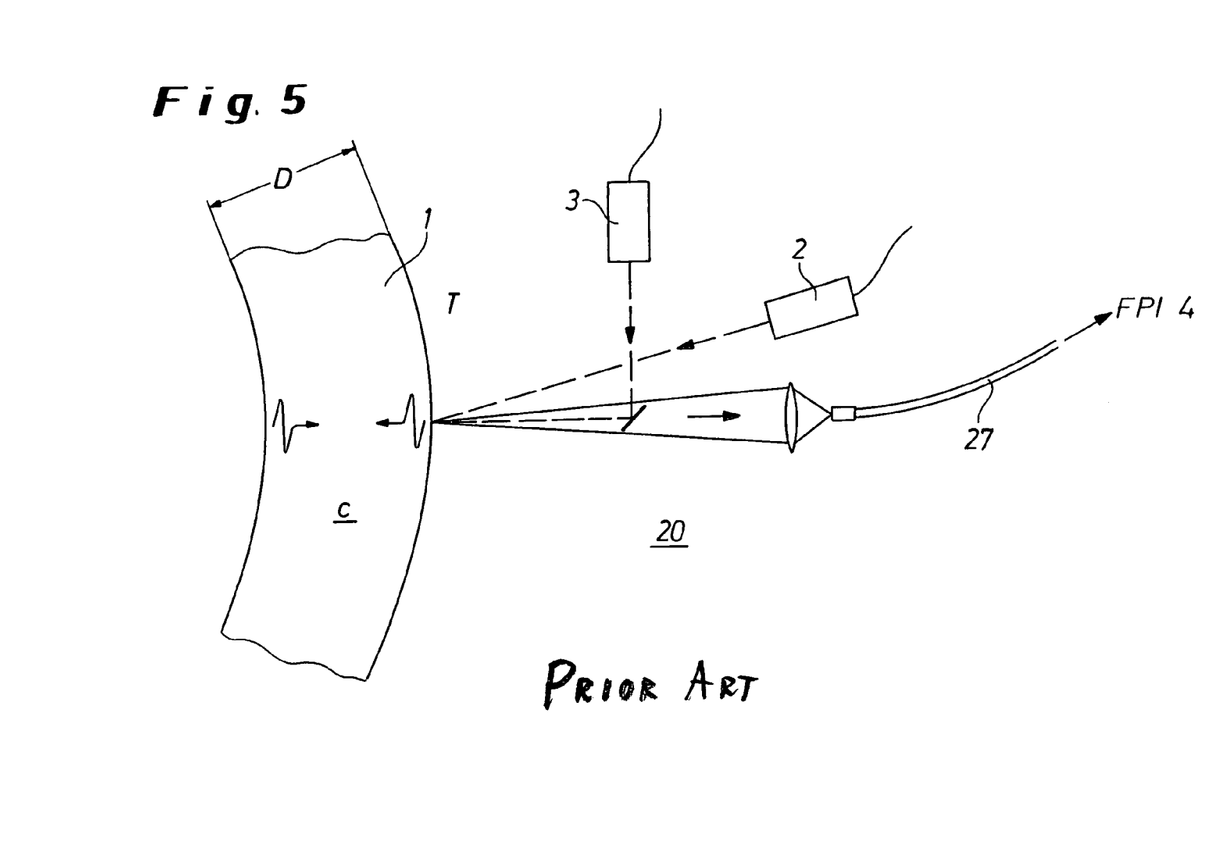
FIG. 5 is a diagram illustrating the fundamentals of the launching of the ultrasonic signal into the pipe wall and the detection of the echo.

In FIG. 5 we have shown a pipe 1 which may be a rolled seamless pipe produced in a Pilger rolling mill or by the Mannesmann piercing technique. Such wall thickness measurements may be made downstream of each of the rolling mill stands or at any other location along the line and serve to provide a quality measurement for the finished product or to control a subsequent or preceding rolling operation.

In FIG. 5 the measuring unit as a whole has been represented at 20 and is a laser ultrasonic wall thickness measuring device which utilizes some classic principles of ultrasonic transit time measurement. In particular, from the time for the two passes of an ultrasonic wave through the thickness D of the pipe and the speed c of sound in the material of the pipe, the thickness D can be calculated. The coupling of ultrasonic pulses to the pipe and the acquisition of the ultrasonic signal from the echo must be effected in a contactless manner since the pipe wall is usually at a temperature T in a range of about 1000° C. during the rolling operation. The methods used can include optical methods in which the measuring head can be spaced sufficiently from the pipe 1 as to prevent thermal damage thereto.

High energy light pulses directed at the surface of the pipe are absorbed at the surface and converted into an ultrasonic pulse which is transmitted from the point at the surface at which the light pulse is applied, across the thickness of the wall and back to the point of the surface at which the excitation pulse was launched. The pulsed infrared light can be derived from a Nd:YAG laser which is pumped by a flash lamp. The launching or excitation laser has been shown at 2. This laser launches a pulse of a duration less than 10 ns and wavelength of 12,064 nm. The laser pulse energy which is absorbed by the pipe wall at the surface gives rise in part to a vaporization of a very thin surface layer (material ablation in the nanometer range). The explosive evaporation of the slight bit of material results in the formation of the ultrasonic pulse in the pipe 1 which lies perpendicular to the pipe surfaces. The reflection from the inner wall of the pipe is the echo which returns to the outer surface of the pipe. As a consequence there is an ultrasonic echo sequence with decreasing amplitude.

The reflected ultrasonic pulse generates at the surface of the pipe undulations or vibrations in a subminiature range and which modulates the light from a second laser 3 (illumination laser) also in a contactless detection of the reflection utilizing the Doppler effect. The illumination laser 3 can be a continuity wave (cu) laser, preferably with twice the frequency of the first laser. The illumination laser is preferably a diode-pump Nd:YAG laser with an operating frequency with a wavelength of 532 nm and can be trained at the excitation point on the surface. The lower frequency laser light undergoes frequency modulation at the surface and the reflected light cone, serving as a carrier for the ultrasonic output signal or echo is passed through a light amplifying collecting lens and a light waveguide 27 to an optical analyzer, i.e. a demodulator which can include a confocal Fabry-Pérot interferometer whose output signal represents the ultrasonic echo sequence.

The further amplification, filtration and signal evaluation of the ultrasonic echo signal can be effected with the usual ultrasonic evaluation unit. The output signal ultimately is the wall thickness D which is calculated from the product of the sound speed c and the transit time t.

Figure 4:
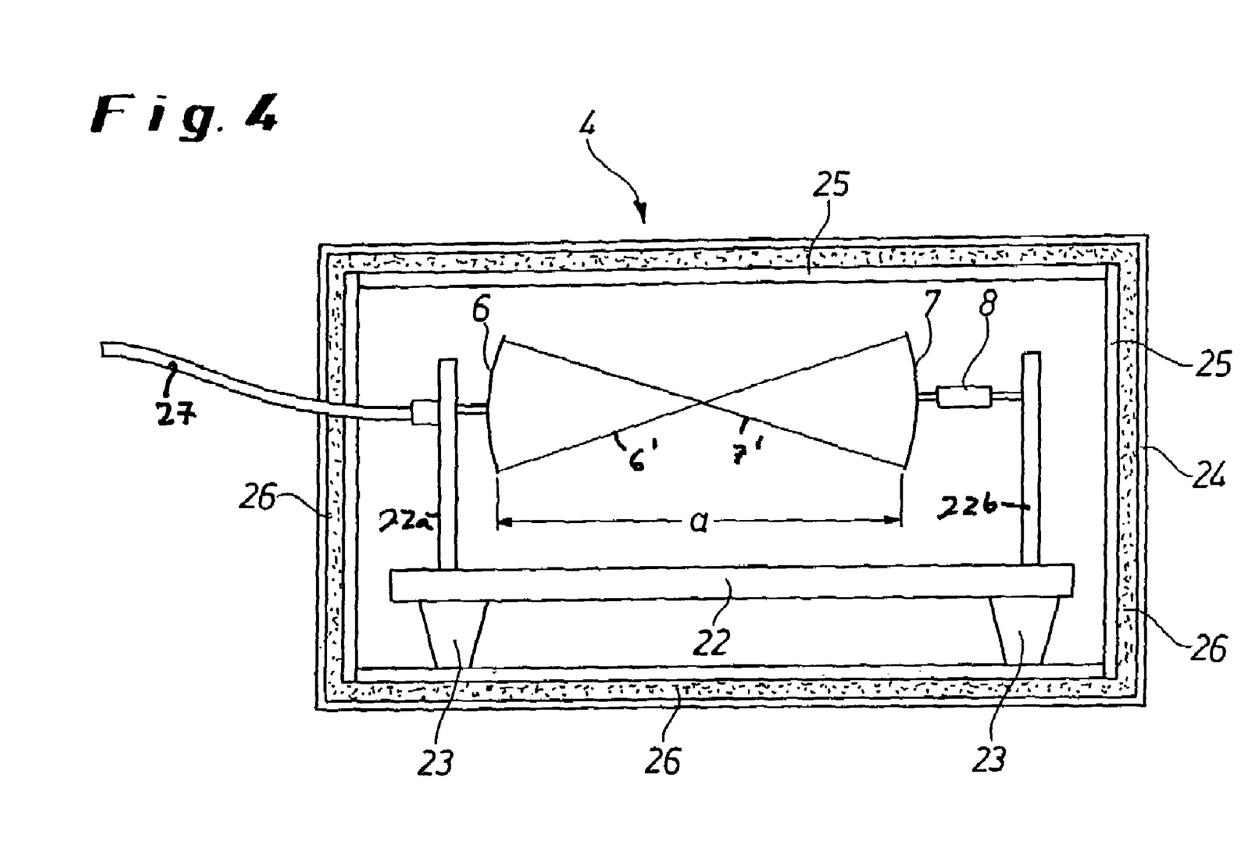
FIG. 4 is a diagrammatic cross sectional view through the vibration-damped housing in the interferometer.
Figure 6:
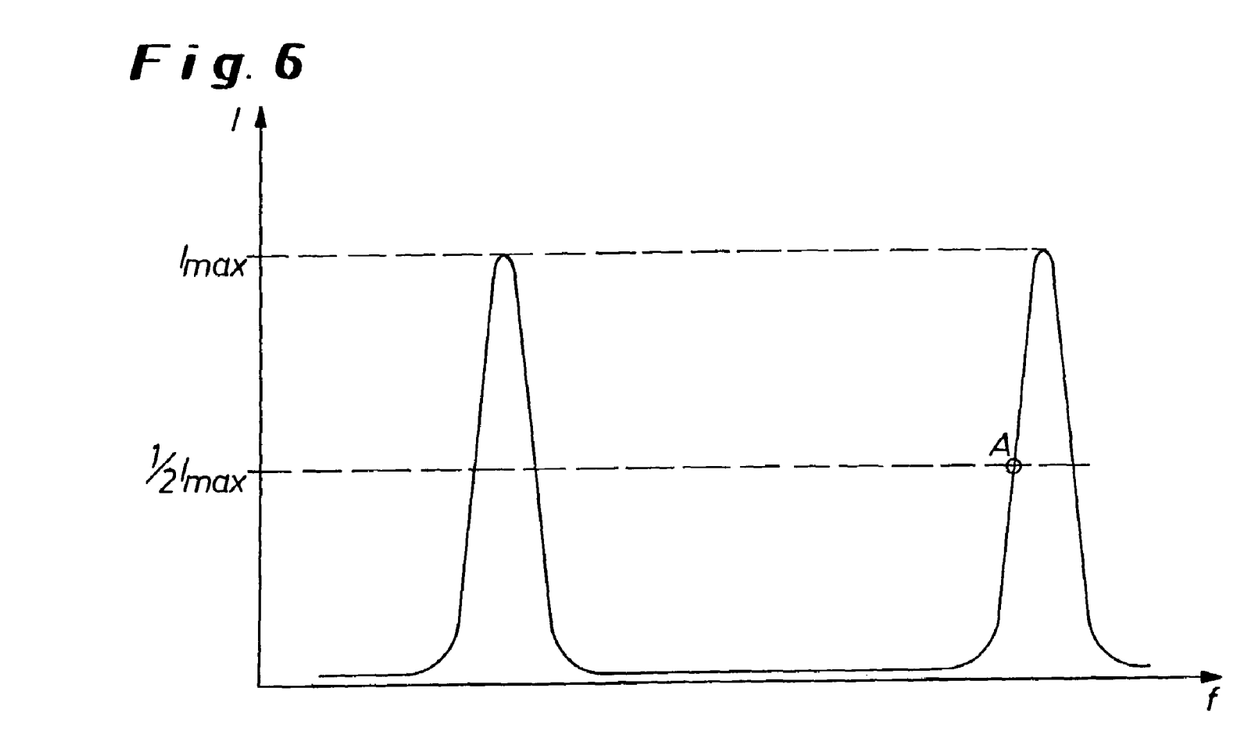
FIG. 6 is a wave form diagram applying the intensity of the signal measured by the interferometer over the frequency of the light.

The Fabry-Pérot interferometer has been illustrated diagrammatically in FIG. 4 and receives its input from the optical waveguide or light-conducting fiber 27. It comprises two mirrors 6 and 7 which are concave toward one another. The light cones associated with these mirrors are represented at 6' and 7' respectively. The Fabry-Pérot interferometer effects an analysis as has been illustrated diagrammatically in FIG. 6. Over the frequency f of the light, as a consequence of resonance, there is an intensity distribution as illustrated in FIG. 6 where the intensity is plotted along the ordinate against frequency f along the abscissa.

An optimum working point A for the wall thickness is found at the half maximum in the steep flank of the intensity curve which corresponds to a given spacing a of the two partially transparent mirrors 6 and 7. The half maximum of the intensity value corresponds to the steepest point on the flank of the intensity curve. In order to maintain this operating point A and thus the resonant conditions of the interferometer, the mirrors 6 and 7 must be positioned precisely relative to one another to the order of nm. For this reason, a piezo crystal 8 is provided as a linear actuator between one of the two supports 22a and 22b and the respective mirror 6 and 7, in this case the mirror 7. The supports 22a and 22b are fixed to a plate 22 and are rigid therewith while the plate 22, on its bottom side, has feet 23. The structural details of the interferometer shown in FIG. 4 will be developed subsequently.

Figure 1:
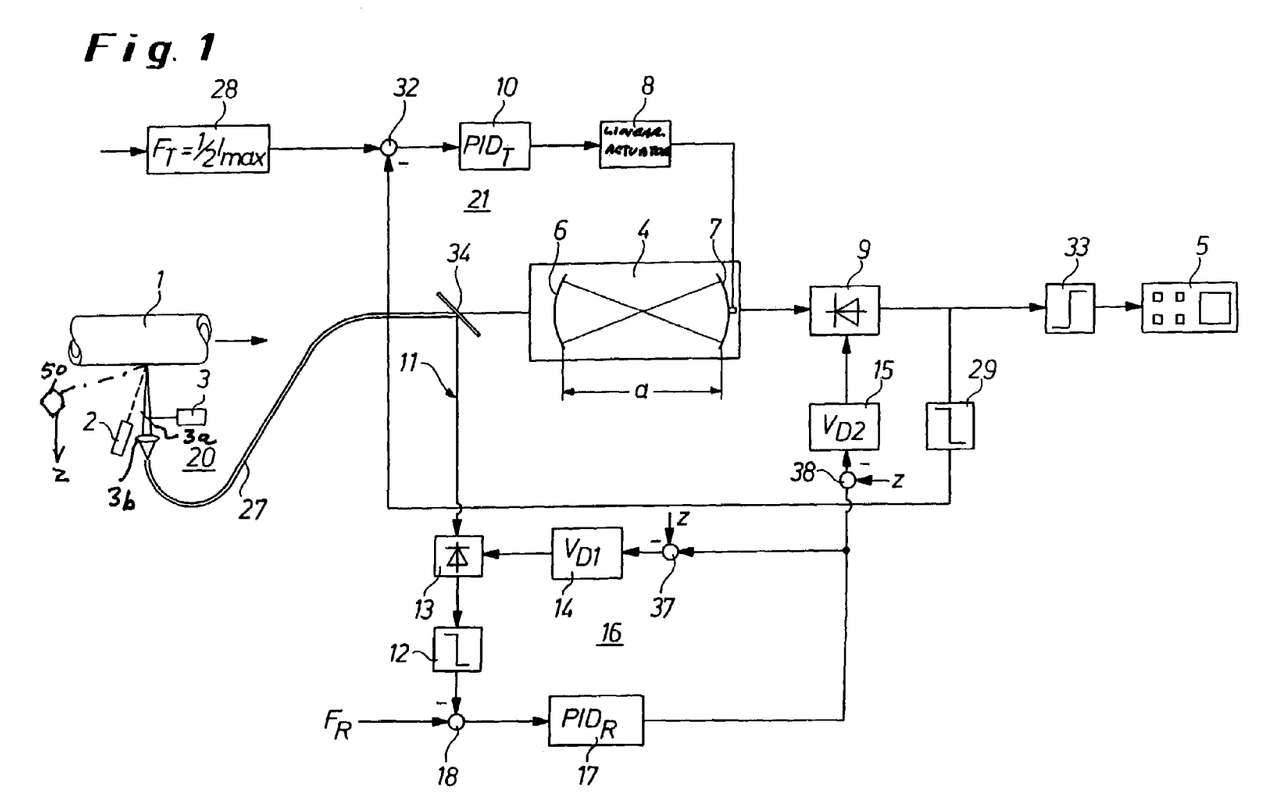
FIG. 1 is a circuit diagram for an apparatus for measuring the wall thickness of a pipe in a rolling line, the mechanical portion being shown only diagrammatically.
Figure 2:
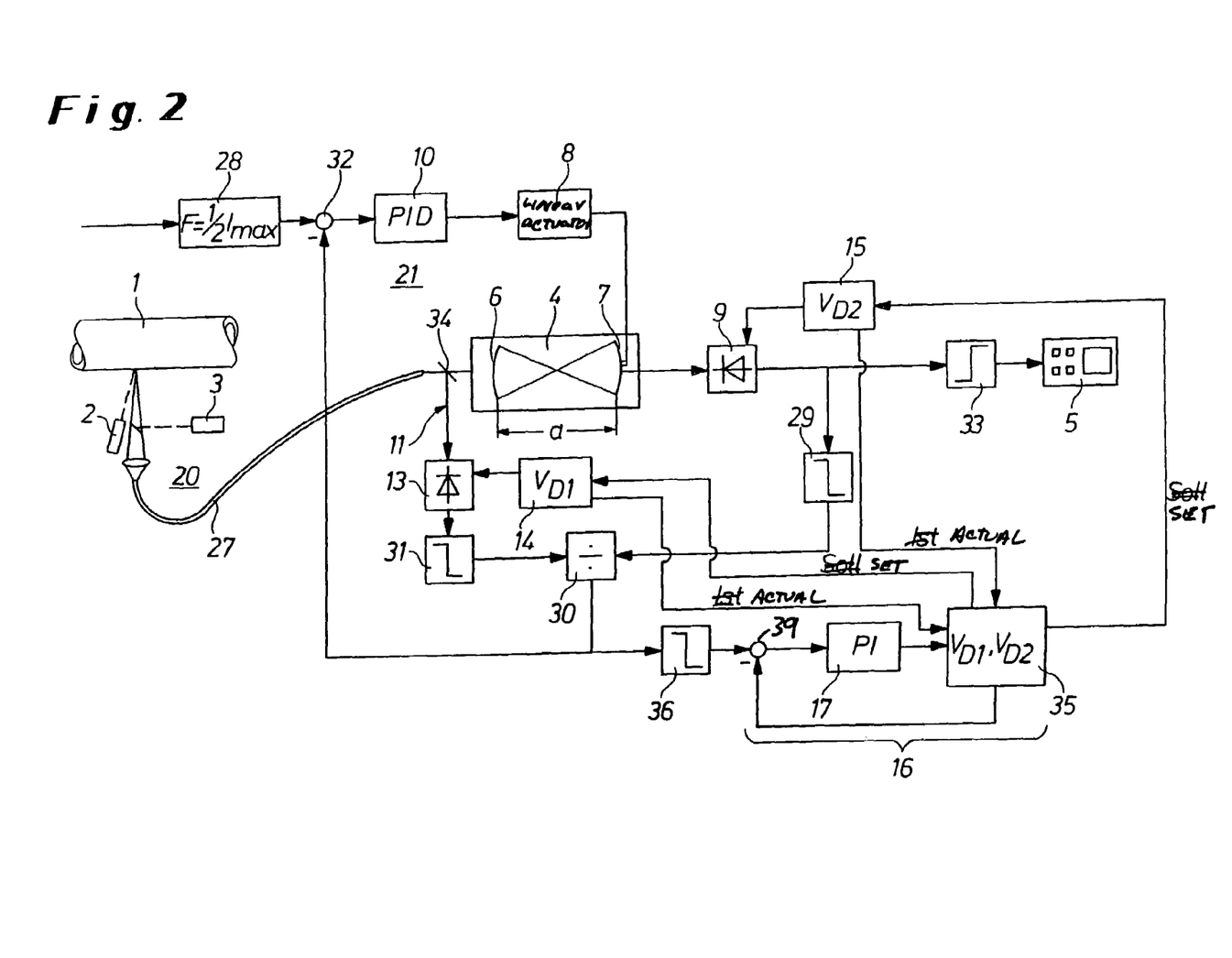
FIG. 2 is a diagram similar to FIG. 1 illustrating another embodiment of the control circuit.
Figure 3:
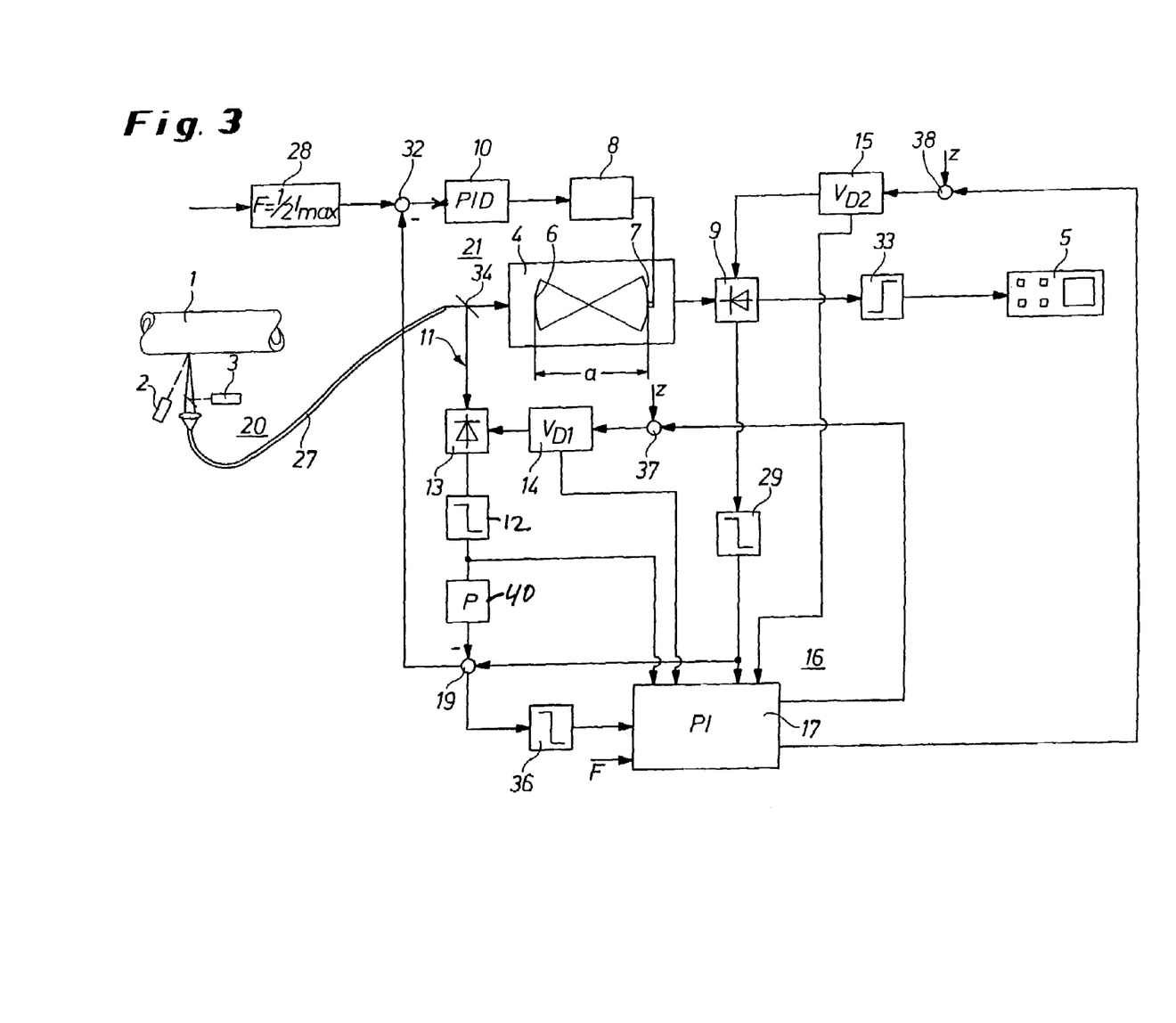
FIG. 3 is still another diagram similar to FIG. 1 showing another alternative.

The circuitry of the system as well as the light paths thereof have been shown in greater detail in FIGS. 1–3 which represent three different embodiments.

In the embodiment of FIG. 1, shown for the measurement of the wall thickness of a pipe 1 in a pipe rolling mill of the type previously described, the pipe 1 is assumed to be displaced in the direction of the arrow, e.g. at discharge from the rolling mill. At this location, a wall thickness measurement is effected as has been diagrammatically described in connection with FIG. 5.

The excitation laser produces at the surface of the pipe 1 an ultrasonic pulse whose reflection serves to modulate a beam from the illumination laser 3 which is trained on the surface of the pipe by the semitransparent mirror 3a and is reflected back in its modulated form to the collecting lens 3b and then to the light waveguide 27 which conducts the light to the Fabry-Pérot interferometer 4 shown only in the most diagrammatic form in FIG. 1.

The two mirrors 6, 7 of the interferometer are held at the optimum spacing a by the exact positioning of the mirror 7 by the linear actuator 8, here shown in the form of a block. The output signal from the interferometer 4 is evaluated in the evaluation unit and computer 5 which forms a product between the transit time for an echo of the ultrasonic pulse to travel over the thickness of the pipe and the speed of sound in that pipe. Generally the spacing between two echoes or between echoes in a sequence of echoes is used to determine the transit time.

Before the system is placed in operation for a wall thickness maintenance of the wall thickness of a rolled pipe 1, the intensity spectrum I over the frequency f of the light is plotted as is apparent from FIG. 6. Both the values of $I_{max}$ and the half values are determined so that the intensity I at the working point A can be established.

This value is inputted as a setpoint to the control circuitry 21 shown in FIG. 1. Here the setpoint input is represented at 28 and the input itself by the command parameter $F_T$ representing the half $I_{max}$ point.

The control circuitry 21 comprises a first controller 10 which is a PID controller (proportional integral-differential controller). The output of the controller is applied directly to the linear actuator 8 which defines the position of the mirror 7 and hence the spacing a.

The light transmitted by the interferometer 4 is measured by a first photodiode 9 which is shown to have its amplification controlled by an amplifier 15. The amplifier 15 is said to be connected to the photodiode 9 but can be included in an integrated circuit with that photodiode. The same applies to the amplifier 14 for a second photodiode 13 to be described subsequently.

The signal measured by the photodiode 9 is fed back through a low pass filter 29 to a difference former or subtractor 32 which deducts the feedback signal from the setpoint value supplied at 28 in delivering the difference signal to the first controller 10. The feedback thus ensures that the Fabry-Pérot interferometer will be maintained at the stable working point A (FIG. 6) and hence the overall measurement will be relatively insensitive to external influences.

The light signal as outputted by the photodiode 9 is transformed into an electrical signal, is fed through a high pass filter 33 to the filter 5.

It is also important that the control system maintain the stability of the system under the relatively crude conditions which may prevail in the rolling mill and that the system not be sensitive to varying reflective characteristics of the pipe surface. The balance of the control system of FIG. 1 serves that purpose.

A beam splitter 34 directs a part of the incoming light signal from the waveguide 27 to the second photodiode 13 which is provided with the amplifier 14. Both the amplifier 15 for the photodiode 9 and the amplifier 14 for the photodiode 13 can have their respective amplification $V_{D2}$ and $V_{D1}$ adjustable. To control the amplifications, a second controller 17 is provided in a closed controlled circuit 16. This control circuit is supplied with a setpoint $F_R$, referred to herein as a second command parameter. This command parameter is applied through a subtractor 18 to a high dynamic PID second controller 17 whose output is supplied to the sum formers or adders 37 and 38 whose other input in each case receives a disturbance parameter z which is a function of the operation of the rolling mill. This can, for example, be a temperature T of the pipe measured at the location on the surface of the pipe by, for example, an optical pyrometer 50. The pyrometer may be a monochromatic pyrometer or a two-color pyrometer (quotient pyrometer).

The second controller acts upon the amplifier 14 and 15 to match their amplifications $V_{D1}$, $V_{D2}$ to maintain a suitable operation of the measuring device. The second controller receives its input from the difference former 18 which, as previously noted, deducts a signal provided by the low pass filter 12 and derived from the second photodiode 13, from the command parameter $F_R$.

The disturbance parameter z which, in the present case can be any process parameter of the rolling mill, is preferably the measured temperature and thus is utilized as a control factor for the input to the controller via its combination with the signal from the second controller 17 to the amplifier 15 and the first photodiode 9 and then to the subtractor 32 at the input to the first controller 10. However, an equivalent, collateral or supplemental input to the control system from the rolling mill is, of course, the signal 11 derived from the measurement process which, through the second photodiode, whose amplification is controlled at 14, also by consideration of this disturbance signal z, provides an input to the second controller 17.

The arrangement according to FIG. 1 is thus a two loop control circuit in which in the first loop 21 the interferometer 4 is optimally set and via the second loop 16, the amplifications of the photodiodes 9 and 13 are provided with a feedback control so that they also operate at optimum working points.

The second controller 17 sets the amplifications of the amplifiers 14 and 15 and couples the two control loops. Because of the presence of the two control loops 16 and 21, any disturbances proximal to the Fabry-Pérot interferometer 4 can thus be eliminated by the primary control circuit 21 while the secondary control circuit 16 serves to eliminate disturbances resulting from different reflection characteristics at the surface of the pipe. Any intensity fluctuations which may result from such reflection variations are thereby eliminated.

The command parameters F ($F_T$, $F_R$) can be obtained before the system is set in operation by running the measuring device in a scanning mode which can yield the frequency course and light the intensity in the interferometer to be determined and stored. This then supplies the intensity peak from which the half intensity can be determined for the optimum working point. The command parameter $F_R$ can be determined by detecting the light intensity with the photodiode 13 over time at the photodiode 13 before the interferometer 4 is connected.

The signal 11 from the fabrication process can also be derived from the pyrometer 50 as the measured temperature. The pyrometer can additionally or alternatively be used, for example, in place of the low pass filter 12, the second photodiode 13, the amplifier 14 and/or the difference former 18 in the control circuit 16. The temperature of the pipe or, more generally, a disturbance parameter, can be therefore directly inputted to control the placing of the interferometer mirrors with greater precision. Since in that case the disturbance parameter is directly supplied to the control circuit for the mirror spacing, the interferometer operates especially stably at its optimum operating or working point.

FIG. 2 differs from FIG. 1 with respect to the control circuitry and can be considered an alternative. In the embodiment of FIG. 2, the light signal derived from the waveguide or optical fiber 27 is split by the semitransparent mirror 34. A portion of the light passes through to the Fabry-Pérot interferometer 4 while the balance is directed to the second photo cell 13. The signal 11 which is used to stabilize the signal measured by the first photo cell 2 is thus also derived from the measuring process as in FIG. 1. Here however the second photodiode 13 feeds the signal measured by it over a low pass filter 31 to a divider 30 or to an equivalent ratio-forming logic element which also receives an input of the measured signal from the first photo diode 9 via another low pass filter 29. The ratio former 30 produces an output signal which is equivalent to a ratio between the two measured signals of the photodiodes 9 and 13. This output signal is applied to the difference former 32 which, as in the case of the FIG. 1, subtracts the ratio signal from the setpoint input at 28 in providing the control signal to the PID controller 10 which, in turn, operates the effector or linear actuator 8. The result is a normalization of the intensity of the light transmitted through the sensor and measured by the photodiode 9 (measurement light signal) with the light measured at the photodiode 13 (reference beam).

Both photodiodes 9 and 13 have amplifiers 15, 14 with logarithmic characteristics. To increase the stability of the working point A of the interferometer 4 even in the crude ambient conditions of the pipe-rolling mill, the second control circuit 16 serves to vary the amplifications $V_{D1}$ and $V_{D2}$ of the amplifiers 14 and 15. The amplifications of the amplifier are adjusted in response to external disturbance signal or influence. For this purpose, the second circuit 16 includes a controller 17 of the proportional-integral type, i.e. a PI controller whose output is applied to a calculating or logic element 35 (e.g. a microprocessor). The calculating element 35 has an algorithm which generates setpoint values for the amplifications $V_{D1}$, $V_{D2}$ of the amplifiers 14 and 15. The setpoint values are applied to the amplifiers 14 and 15. The control circuitry 16 which monitors the actual values of the amplifications includes inputs from the amplifiers 14 and 15 to the calculating unit 25. An output from the calculating unit 35 is applied to a difference former 39 which delivers the difference signal to the second controller 17 after subtracting it from the signal derived from the ratio former 30 through the low pass filter 36. With the aid of the algorithm in the calculating unit 35, both the absolute level of the amplification as well as a ratio of the two amplifications can be correlated with one another.

While the control circuit 21 is equipped with the high dynamic PID controller 10, the control circuit 16 has a PI controller which ensures that the control velocity of this latter circuit is slower than that of the circuit 21. While deviations from the light transmitted by the interferometer 4 are compensated very rapidly and brought to setpoint value quickly, the amplifiers 14 and 15 and their amplifications respond only slightly to the compensation since a reaction here need be only from pipe to pipe.

The purpose of the arrangement of FIG. 2 is to ensure that the intensity level at the output of the interferometer is sufficiently high and is maintained at the half transmission peak level ($½ I_{max}$).

Preferably the controller output magnitude is so limited adaptively that the working point A on the flank of the intensity curve normally is not relinquished.

FIG. 3 shows a further variant of the control arrangements in which instead of normalization of the transmission signal to the reference signal as in FIG. 2, the difference between the transmission signal and the reference signal forms the controller input magnitude. In addition, in this system the disturbance parameter z which can be a temperature value obtained from the pyrometer, is also included in the control scheme.

For this purpose, a difference former 19 is provided which receives the input from a low pass filter 12 and a proportional controller 40 from the diode 13 connected to the line 11 previously described. Another input to the difference former is derived from the photodiode 9 via the low pass filter 29. The difference signal is supplied from the difference former 19 to the difference former 32 and is subtracted from the setpoint input supplied at 28 in its feed to the controller 10.

The slow regulation is effected by controlling the amplifications $V_{D1}$ and $V_{D2}$ of the amplifiers 14 and 15 or their ratio to one another by the slowly-operating control circuit 16 with the PI controller 17.

In addition in the system of FIG. 3, the disturbance parameter z is introduced by respective inputs to summers or adders 37 and 38 whose outputs are applied to control the amplifiers 14 and 15 respectively.

These disturbance parameters normally will represent the temperature T of the pipe or some other parameter of the rolling system.

FIG. 4 shows that the interferometer 4 can be protected from sound waves and other vibrations transmitted through the air or through body contact or solid contact with the interferometer. The interferometer is thus mounted on a carrier or support 22 which itself may be composed of a high vibration-damping material and which has vibration-absorbing feet 23 resting upon a bottom wall of a housing 24.

The latter can have vibration-damping plates 25 which may be composed of wood or other relatively dense sound-absorbing material, especially fibers of an intermediate density or particularly suitable for the absorption of vibration. Between the inner walls of the housing 24 and the plate-like damping elements 25, a foam 26 can be injected, e.g. a polyurethane foam, to optimize the damping effect of the housing on the interferometer 4.

These precautions ensure that the interferometer 4 can operate even in the rough conditions of a rolling mill and in the presence of variations of the optical characteristics of the rolled product without problems.

We claim:

1. A method of measuring a wall thickness of a pipe in a pipe rolling line, comprising the steps of:
   (a) launching an ultrasonic pulse into a wall of a pipe whereby an ultrasonic wave is transmitted across a thickness of said wall and an ultrasonic echo is returned to a surface of the pipe;
   (b) training a laser beam from an illuminating laser onto said surface whereby a laser-light reflection from said surface is modulated by said echo;
   (c) collecting laser light reflected from said surface and modulated by said echo as an input optical signal and feeding said input optical signal to a Fabry-Pérot interferometer having two mirrors spaced apart by a predeterminable distance (a), said Fabry-Pérot interferometer having an output optical signal;
   (d) passing said output optical signal to a first photodiode and converting said output optical signal into an electrical signal and evaluating said electrical signal to determine transit time for echoes spanning the thickness of said pipe and, from said transit time and a speed of sound in material of the pipe, said wall thickness;
   (e) at least one of the steps of:
      ($e_1$) deriving a photodiode-measurement control signal from said electrical signal,
      ($e_2$) deriving a input-measurement control signal from said input optical signal, and
      ($e_3$) deriving a rolling-line control signal representing a fabrication process variable;
   (f) controlling a linear actuator determining a position of at least one of said mirrors directly or indirectly through a controller for said linear actuator with at least one of said control signals;
   (g) regulating said photodiode with the output from a variable amplification amplifier; and
   (h) during steps (e), (f), and (g)
      ($h_1$) varying a signal measured by said first photodiode as a function of the input optical signal as measured by a second photodiode and feeding the varied signal to said controller, each of said first and second photodiodes having respective amplifiers for amplifying the signals measured thereby, and
      ($h_2$) controlling the amplifiers in a respective control circuit based upon at least one predeterminable command variable.

2. The method defined in claim 1 wherein the amplification of said amplifiers is controlled in dependence upon a signal from said second photodiode in said respective control circuit in response to one of said command variables.

3. The method defined in claim 1 wherein a signal from said first photodiode is varied in dependence upon a measured temperature of said pipe before it is fed to said controller.

4. The method defined in claim 1 wherein the amplification of at least one of said amplifiers is controlled in dependence upon a disturbance variable (z) applied to at least one of said amplifiers through at least one adder.

5. The method defined in claim 4 wherein said disturbance variable (z) is a measured temperature (T) of said pipe.

6. The method defined in claim 3 wherein pipe temperature is measured with a pyrometer.

7. The method defined in claim 1 wherein said controller is a high-dynamic regulator acting upon said linear actuator.

8. The method defined in claim 1 wherein said controller is a regulator applying PID control to said linear actuator.

9. The method defined in claim 1 wherein the control circuits for said amplifiers are operated with high dynamic controllers.

10. The method defined in claim 1, further comprising applying PID control to at least one of said amplifiers.

11. The method defined in claim 1, further comprising applying PI control to at least one of said amplifiers.

12. The method defined in claim 1, further comprising the step of defining at least one of said command variables by stepwise scanning of a course of functional response of the respective control circuit prior to use thereof in a wall thickness determination of a rolled pipe.

13. A device for measuring a wall thickness of a pipe in a pipe rolling line, the device comprising:
   a laser ultrasonic measuring unit having an excitation laser trained on a surface of a pipe for launching an ultrasonic pulse into a wall of the pipe whereby an ultrasonic wave is transmitted across a thickness of said wall and an ultrasonic echo is returned to the surface of the pipe, an illuminating laser directing a laser beam onto said surface whereby a laser-light reflection from said surface is modulated by said echo, and an interferometer receiving laser light reflected from said surface and modulated by said echo as an input optical signal and having two mirrors spaced apart by a predeterminable distance (a), said interferometer having an output optical signal evaluatable to determine transit time for echoes spanning the thickness of said pipe and, from said transit time and a speed of sound in material of the pipe, said wall thickness, said interferometer having a linear actuator for relatively displacing said mirrors to adjust said distance; and
   a control system acting upon said linear actuator and including:
      a first photodiode receiving said output optical signal,
      a controller responsive to a signal obtained from said first photodiode and controlling said linear actuator, and
      a second photodiode receiving said input optical signal,
      respective amplifiers connected to said photodiodes for amplifying respective signals measured thereby, and
      a control circuit including a further controller for regulating amplifications of said amplifiers to predetermined values.

14. The device defined in claim 13 wherein at least one of said amplifiers is connected to an adder for introducing a disturbance parameter as a control factor for the respective amplifier.

15. The device defined in claim 13, further comprising a pyrometer for measuring the temperature of said pipe and providing an input to at least one of said controllers.

16. The device defined in claim 13 wherein at least one of said amplifiers has a logarithmic characteristic.

17. The device defined in claim 13 wherein said circuit includes a tolerance former for determining a difference between the measured signal of said first photodiode and the measured signal of said second photodiode and feeding a difference signal to the controller responsive to the signal obtained from said first photodiode.

18. The device defined in claim 13, further comprising a vibration-damped support for said interferometer.

19. The device defined in claim 18 wherein said support has vibration-absorbing feet on a bottom side thereof.

20. The device defined in claim 19 wherein said support has an enclosure for said interferometer enclosing said interferometer from all sides.

21. The device defined in claim 20 wherein said enclosure is composed of wood.

22. The device defined in claim 20 wherein said support is provided on inner sides with plate-shaped damping elements.

23. The device defined in claim 22 wherein said damping elements are fibers of medium density.

24. The device defined in claim 22, further comprising a foam between said plate-shaped damping elements and inner sides of said support.

* * * * *